United States Patent
Panchapakesan et al.

(10) Patent No.: US 10,108,809 B2
(45) Date of Patent: Oct. 23, 2018

(54) APPLYING RIGHTS MANAGEMENT POLICIES TO PROTECTED FILES

(71) Applicant: AIRWATCH LLC, Atlanta, GA (US)

(72) Inventors: Ramani Panchapakesan, Bangalore (IN); Saurabh Agrawal, Bangalore (IN); Suja Ramachandran, Atlanta, GA (US); Sushilvas Vasavan, Bangalore (IN)

(73) Assignee: AIRWATCH LLC, Atlanta, GA (US)

(*) Notice: Subject to any disclaimer, the term of this patent is extended or adjusted under 35 U.S.C. 154(b) by 184 days.

(21) Appl. No.: 14/977,648

(22) Filed: Dec. 22, 2015

(65) Prior Publication Data

US 2017/0124342 A1 May 4, 2017

(30) Foreign Application Priority Data

Oct. 30, 2015 (IN) ............................. 5865/CHE/2015

(51) Int. Cl.
*G06F 21/62* (2013.01)
(52) U.S. Cl.
CPC ................................. *G06F 21/6209* (2013.01)
(58) Field of Classification Search
CPC .................. G06F 21/10; G06F 21/6209; H04L 29/06578; H04L 29/06986
See application file for complete search history.

(56) References Cited

U.S. PATENT DOCUMENTS

| | | | | |
|---|---|---|---|---|
| 8,660,961 B2 * | 2/2014 | Raley | ...................... | G06F 21/10 705/51 |
| 8,931,081 B2 * | 1/2015 | Celi, Jr. | .............. | G06F 21/6236 726/18 |
| 9,356,936 B2 * | 5/2016 | Negrea | .................... | G06F 21/10 |
| 9,449,154 B2 * | 9/2016 | Grassel | ................ | G06Q 10/101 |
| 9,613,190 B2 * | 4/2017 | Ford | ....................... | G06F 21/10 |
| 2001/0053691 A1 * | 12/2001 | Harma | .................... | A63F 13/12 455/419 |
| 2003/0233462 A1 * | 12/2003 | Chien | ..................... | G06F 21/10 709/229 |
| 2004/0044779 A1 * | 3/2004 | Lambert | ................. | G06F 21/10 709/229 |
| 2004/0054893 A1 * | 3/2004 | Ellis | ........................ | G06F 21/10 713/165 |
| 2005/0204038 A1 * | 9/2005 | Medvinsky | ............. | G06F 21/10 709/225 |
| 2006/0129496 A1 * | 6/2006 | Chow | ..................... | G06F 21/10 705/59 |

(Continued)

FOREIGN PATENT DOCUMENTS

WO 2013009290 1/2013

OTHER PUBLICATIONS

International Search Report dated Feb. 6, 2017 for Application No. PCT/US2016/059142.

*Primary Examiner* — Harunur Rashid
*Assistant Examiner* — Sher A Khan
(74) *Attorney, Agent, or Firm* — Thomas Horstemeyer, LLP

(57) ABSTRACT

Examples of the present disclosure relate to protecting files with an information rights policy. Files can be protected as specified by a content policy associated with the file. The content policy can specify whether the file should be protected while at rest on a device as well as when the file is shared with another user of an enterprise.

23 Claims, 7 Drawing Sheets

(56) References Cited

U.S. PATENT DOCUMENTS

| | | | |
|---|---|---|---|
| 2007/0283420 A1* | 12/2007 | Rantalahti | G06F 21/10 726/4 |
| 2008/0115191 A1 | 5/2008 | Kim et al. | |
| 2008/0172718 A1* | 7/2008 | Bradley | G06F 21/10 726/1 |
| 2008/0178001 A1* | 7/2008 | Kim | G06F 21/10 713/167 |
| 2009/0063629 A1* | 3/2009 | Jeong | G06F 21/10 709/203 |
| 2011/0162040 A1 | 6/2011 | Stephens | |
| 2013/0074142 A1 | 3/2013 | Brennan et al. | |
| 2014/0033265 A1* | 1/2014 | Leeds | G06F 21/10 726/1 |
| 2014/0053227 A1* | 2/2014 | Ruppin | G06F 21/10 726/1 |
| 2015/0020151 A1* | 1/2015 | Ramanathan | G06F 21/6218 726/1 |
| 2015/0310188 A1* | 10/2015 | Ford | G06F 21/10 726/28 |

* cited by examiner

APPLYING RIGHTS MANAGEMENT POLICIES TO PROTECTED FILES

BACKGROUND

Some data storage providers operate data centers where data storage is allocated for several users. A user can store and retrieve data, such as images, videos, and word processing documents, using one or more client devices that communicate with a data storage system over a network. The data can be associated with a user account. In enterprise contexts, an administrator may wish to impose restrictions on files or documents that are associated with files stored in a remote storage account through the use of third-party enabled information rights management (IRM) or digital rights management (DRM) technologies.

In some scenarios, IRM or DRM technologies require additional user intervention or user interaction in order to access a file that has an IRM or DRM layer applied. The additional user interaction, in some situations, may be viewed as undesirable, tedious, or complicated by users. As a result, users may avoid applying IRM or DRM technologies to sensitive enterprise content even if an enterprise imposes a rule that certain content must be protected by IRM or DRM technologies. In these scenarios, sensitive content may leak outside of an enterprise, which can have undesirable consequences.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

The present disclosure relates to storing and retrieving files that are protected by information rights management (IRM) or digital rights management (DRM) technologies using data storage systems that are accessible to client devices over a network. In the context of this disclosure, although the term IRM is predominantly used, alternative rights management technologies, such as DRM technologies, can also be employed in the place of IRM technologies according to examples of this disclosure. In one example, an information rights service associated with a remote storage area associated with user accounts can associate files with a content policy.

The content policy specifies whether a particular file should be protected with an IRM technology while at rest on a client device. The content policy can also specify whether the file is permitted to be shared by a user with other users. In some scenarios, the content policy can specify which users or user groups with which a file can be shared. The content policy can also specify whether an IRM policy should be applied to a file if or when the file is shared with other users.

In one example, IRM policies can be automatically applied by an information rights service associated with a remote storage area and by an application executed on a user's device to ensure that a file stored on the user device is stored as a protected file with an IRM layer. As another example, IRM policies can be automatically applied when a file is shared by one user with another user to reduce the likelihood that the contents of the file remain under enterprise control. Thus, examples of the present disclosure can provide a mechanism for IRM policies to be applied to files and documents so the data security and tracking of the file can occur using an IRM technology and service that is provided by the enterprise or by a third party entity.

Figure 1:
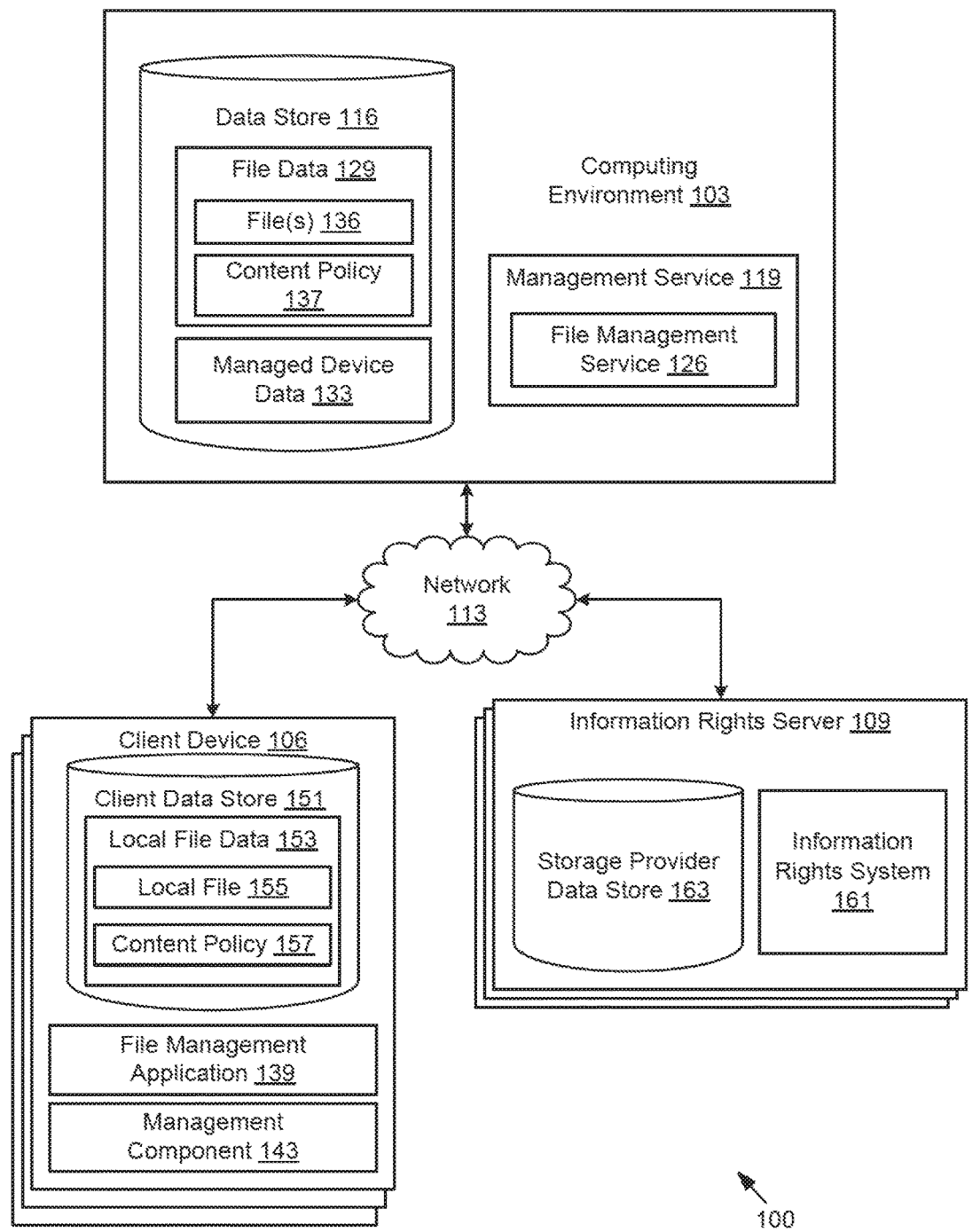
FIG. 1 is a drawing of a networked environment according to various examples.

With reference to FIG. 1, shown is a networked environment 100 according to various embodiments. The networked environment 100 shown in FIG. 1 includes a computing environment 103, a client device 106, an information rights server 109, and potentially other components, which are in data communication with each other over a network 113. The network 113 includes, for example, the Internet, one or more intranets, extranets, wide area networks (WANs), local area networks (LANs), wired networks, wireless networks, other suitable networks, or any combination of two or more networks. The networks can include satellite networks, cable networks, Ethernet networks, telephony networks, or other types of networks.

The computing environment 103 can include, for example, a server computer or any other system providing computing capabilities. Alternatively, the computing environment 103 can employ multiple computing devices that can be arranged, for example, in one or more server banks, computer banks, or other arrangements. Such computing devices can be located in a single installation or can be distributed among many different geographical locations. For example, the computing environment 103 can include multiple computing devices that together form a hosted computing resource, a grid computing resource, or any other distributed computing arrangement. In some cases, the computing environment 103 can operate as at least a portion of an elastic computing resource where the allotted capacity of processing, network, storage, or other computing-related resources can vary over time. The computing environment 103 can also include or be operated as one or more virtualized computer instances that are executed in order to perform the functionality that is described herein. Generally, the computing environment 103 can be operated in accordance with particular security protocols such that it is considered a trusted computing environment.

Various systems can be executed by the computing environment 103. Also, various data is stored in a data store 116 that is accessible to the computing environment 103. The data store 116 shown in FIG. 1 can be representative of multiple enterprise data stores 116. The data stored in the data store 116 is associated with the operation of the various components described below.

A management service 119 and other systems can be executed in the computing environment 103. The management service 119 can be executed to manage or oversee the operation of multiple client devices 106. In some embodiments, an enterprise, such as one or more companies or other organizations, can operate the management service 119 to oversee or manage the operation of the client devices 106 of its employees, contractors, customers, or other users having user accounts within the enterprise.

The management service 119 can execute a file management service 126, and potentially other components. The management console 123 can facilitate administration of devices of an enterprise by administrators of the management service 119. For example, the management console 123 can generate one or more user interfaces that facilitate interaction with the management service 119. These user interfaces can facilitate inputting of commands or other information for the management service 119. Additionally, the user interfaces can include presentations of statistics or other information regarding the client devices 106 that are managed by the management service 119.

The file management service 126 can obtain and store various information regarding files that are associated with one or more client devices 106 or the management service 119. That is, the file management service 126 can create and maintain an activity log associated with a particular file. In one embodiment, an activity log associated with a particular file can specify one or more locations where the file is stored, one or more encryption keys needed to encrypt and/or decrypt the file, permissions (e.g., access rights) associated with the file, versions of file, a historical listing of when, how, and by whom the file has been accessed or shared, or other information associated with the file. For example, an activity log associated with a board meeting document can specify that the document: (1) is associated with an access right limiting access to four board members, limiting access to October $27^{th}$ between 1 PM and 2 PM, and limiting access to an environment that prevents a copy function; (2) was shared with the four board member users on October $26^{th}$; (3) was downloaded by the four board member users on October $27^{th}$ at 1 PM, was stored on the four board member users' devices from 1 PM to 2 PM, and was removed from the four board member users' devices at 2 PM. To facilitate viewing of an activity log associated with a particular file, the file management service 126 can provide a user interface through which authorized user may view the activity log (e.g., the creator of the file, an administrator of the file).

The file management service 126 can also facilitate access to files of a user that are stored in the data store 116 as well as in other data stores or remote storage locations that might be operated by third parties. The file management service 126 can also determine whether an IRM policy should be applied to a particular file when the file is downloaded by a user to a client device 106 or shared with another user. The file management service 126 can also determine which type of IRM policy should be applied in these scenarios.

The data stored in the data store 116 can include file data 129, managed device data 133, and other information. The file data 129 can include data corresponding to one or more files 136 that are stored on behalf of or by users of an enterprise and a content policy 137 that corresponds to each of the files 136. A content policy 137 corresponding to a file 136 represents information about whether a particular file 136 should be stored as a protected file with an IRM policy applied when the file 136 is downloaded by or on behalf of a user to a client device 106. The content policy 137 can also identify a particular IRM policy or IRM technology that should be applied to a file 136 when the file 136 is at rest on a client device 106.

In some examples, files 136 can be stored in a repository that is external to the data store 116 and that may be operated by a third party data storage provider. For example, a user can link a storage account associated with a third party repository with an account of the user within the enterprise associated with the management service 119. For example, a user can store a file in the third party repository, where the third party repository is linked to the user's account within the enterprise. The user can then access files stored in the third party repository using the file management application 139. In this scenario, file data 129 can store a reference to the file 136 stored in the third party repository along with a content policy 137 that is associated with the file 136. In this way, the file management application 139 or file management service 126 can apply an IRM policy specified by the content policy 137 when the file is accessed or shared using the file management application 139.

The content policy 137 can also specify whether the file 136 can be shared with other users within or outside of the enterprise. The content policy 137 can identify which users or groups of users a particular file 136 is permitted to be shared. The content policy 137 can also identify an IRM policy that should be applied to a file 136 before the file 136 is shared with another user. In some examples, the file data 129 can also include other information about files 136 that are stored in the data store 116. For example, file data 129 can include a unique identifier, the location, an encryption key, permissions, the file version, access history, or other information for a particular file 136. In some examples, the content policy 137 can also be applied to certain folders or directories within a storage area associated with a user.

As another example, the content policy 137 can also be associated with certain recipient users. In this scenario, a content policy 137 can specify that a particular IRM policy should be applied to a file 136 whenever a file 136 is sent to a particular recipient user. For example, a content policy 137 can identify a recipient user by email address, phone number, username, user role, or any other user identifier. In some examples, the content policy 137 can specify a particular IRM policy for files 136 sent to a user outside an enterprise and another IRM policy for one or more users inside the enterprise. The content policy 137 can also specify particular IRM policies that should be applied to files 136 that are stored in third party repositories. In one scenario, the content policy 137 can specify that the file management service 126 or file management application 139 should apply a particular IRM policy to files that are stored in a third party repository.

The managed device data 133 can include information regarding the client devices 106 that are managed or controlled by the management service 119. The managed device data 133 for a particular client device 106 can include, for example, the identification of a user assigned to the client device 106, authentication data associated with a user assigned to the client device, the identification of applications that are installed in the client device 106, historical data regarding the operation of the client device 106, and other information.

In addition, the managed device data 133 for a particular client device 106 can include one or more device profiles. A device profile can comprise a set of one or more compliance rules that can be specified by the management service 119. Each compliance rule can specify one or more conditions that must be satisfied for a client device 106 to be deemed compliant with the compliance rule. As a non-limiting example, a compliance rule can specify that particular applications are prohibited from being installed on a client device 106. As another non-limiting example, a compliance rule can specify that a lock screen is required to be generated when the client device 106 is "awoken" from a low power (e.g., "sleep") state and that a passcode is required for a user to unlock the lock screen. Additionally, one or more compliance rules can be based on time, geographical location, or other predefined conditions. When the compliance rules for a particular device profile are satisfied, the management service 119 can deem the corresponding client device 106 as being compliant with the device policy.

The client device 106 is representative of multiple client devices 106 that can be coupled to the network 113. The client device 106 can include, for example, a processor-based system such as a computer system. The computer system can be embodied in the form of a desktop computer, a laptop computer, a personal digital assistant, a smartphone, or any other device with like capability. The client device 106 can include a display as well as one or more input devices, such as a mouse or touchscreen that facilitates a user input or other types of data input into the client device 106.

The client device 106 can execute a file management application 139, a management component 143, and potentially other components. The file management application 139 can access, manage, edit, or perform other functions with respect to files that are stored on the client device 106. As examples, a file can include an image, a video, a word processing document, a spreadsheet, or other types of content. In some examples, the file management application 139 can impose restrictions on access to files stored on the client device 106 by requiring the client device 106 to be in compliance with compliance rules that are specified by the management service 119 before access to a file is granted. The file management application 139 can generate user interfaces that allow a user of the client device 106 to view contents of a file. For example, the file management application 139 can render files, such as documents, images or videos. In addition, the file management application 139 can also provide editing capability so that a user can edit the contents of a file and determine where the edited file is uploaded to the file management service 126, which can save the edited file to the data store 116.

Additionally, the file management application 139 can provide sharing functionality for a user. In one scenario, the file management application 139 can allow a user to send a file or a reference to a file to another user. The other user can be a member of the enterprise and be associated with a user account. The other user can also be an external user that does not have a user account within the enterprise.

The management component 143 can be executed in the client device 106 to monitor or manage at least a portion of the data, applications, hardware components, location, or other parameters of the client device 106. The management component 143 can also identify whether the client device 106 is operating in accordance with the one or more compliance rules for one or more device profiles that have been assigned to the client device 106. In some embodiments, the management component 143 can function as a device management service that operates as a portion of an operating system for the client device 106. In other embodiments, the management component 143 can function as a device management agent that operates in the application layer of the client device 106 and that monitors at least some of the activity being performed in the client device 106. In other embodiments, the management component 143 can comprise an application wrapper that interfaces with a software component to facilitate overseeing, monitoring, or managing one or more resources of the client device 106. Alternatively, the management component 143 can be a portion of an application that was developed, for example, using a Software Development Kit (SDK) that facilitates the inclusion of functionality within the application that monitors or manages at least a portion of the resources for the client device 106.

The management component 143 can be executed by the client device 106 automatically upon startup of the client device 106. Additionally, the management component 143 can run as a background process in the client device 106. Accordingly, the management component 143 can execute without user intervention in some embodiments. Additionally, the management component 143 can communicate with the management service 119 in order to facilitate the management service 119 managing the client device 106. For example, the management component 143 can obtain compliance rules from the management service 119, and the management component 143 can determine whether the client device 106 is operating in accordance with those compliance rules.

In another example, the management component 143 transmits data that indicates the status of settings for the client device 106, and the management service 119 uses this data to determine whether the client device 106 is operating in accordance with compliance rules. If it is determined that the client device 106 is not in compliance with one or more compliance rules, the management component 143 or the management service 119 causes a remedial action to be performed. Examples of remedial actions include, notifying a user of the device or an administrator of the management service 119, causing device settings to be changed so that the client device 106 becomes compliant with the compliance rules, and wiping data in the client device 106.

The client device 106 can also have a client data store 151 that stores data, such as files that are associated with a user account corresponding to the client device 106. The client data store 151 can include flash memory, a hard drive, or other mass storage resources of the client device 106 where data can be housed. The client data store 151 can include access protected portions of storage that are separated by application or by an application developer. In one example, the client data store 151 can include file data 153, which represents local copies of data associated with files 136 of a particular user account in the enterprise.

Accordingly, the local file data 153 can include one or more local files 155 that are stored on the client device 106 and that are associated with a user account in the computing environment 103. The local files 155 can include a subset of the files 136 that are stored in the data store 116 on behalf of a particular user account. Additionally, for each local file 155 stored in the local file data 153, a copy of a content policy 157 associated with the file is also stored. In one example, the file management application 139 can facilitate downloading or synchronizing local files 155 and files 136 between the client data store 151 and data store 116.

The information rights server 109 can include, for example, a server computer or any other system providing computing capabilities. Alternatively, the information rights server 109 can employ multiple computing devices that can be arranged, for example, in one or more server banks, computer banks, or other arrangements. The computing devices can be located in a single installation or can be distributed among many different geographical locations. For example, the information rights server 109 can include multiple computing devices that together form a hosted computing resource, a grid computing resource, or any other distributed computing arrangement. In some cases, the information rights server 109 can operate as at least a portion of an elastic computing resource where the allotted capacity of processing, network, storage, or other computing-related resources can vary over time. The information rights server 109 can also include or be operated as one or more virtualized computer instances that are executed in order to perform the functionality that is described herein.

The information rights server 109 can represent multiple servers or services that are operated by third parties that are external to an enterprise associated with the computing environment 103. The information rights server 109 can represent any server or service that is associated with certain IRM technologies or information rights providers for the purposes of determining whether a particular user is entitled to access a file that is protected by the user of the client device 106 or the entity that operates the computing environment 103. An information rights provider can be a public IRM provider offering IRM services in which a user's access to a particular file is validated by an information rights server 109 based upon credentials provided by the user. In other words, the IRM provider can provide IRM services to users of client devices 106 as well as an enterprise associated with the users. To this end, users of the enterprise may be associated with a user account within the information rights server 109 with which authentication credentials are linked.

In one example, a particular IRM layer can be applied to a file so that access to the contents of the file using a particular viewer application is restricted until the user authenticates with the information rights server 109 using a username, password, or other form of credential. When the user authenticates with the information rights server 109, the information rights server 109 can instruct a viewer application, such as the file management application 139 or another viewer application, to allow access to the contents of the file. The information rights server 109 can also log activity with respect to a file 136 that is protected by an IRM layer. For example, a viewer application accessing a file 136 that is protected by an IRM policy can report whenever a file 136 is accessed by a user and an identity of user credentials that are used to access a particular file 136. In some examples, the information rights server 109 can also log attempts to share or send a file 136 protected by an IRM policy to other users.

The information rights server 109 can execute an information rights system 161 that performs the various activities associated with the information rights server 109. The information rights system 161 can provide an application programming interface (API) or any other suitable interface that facilitates communication between the information rights system and the client device 106 or file management service 126. Data associated with the information rights server 109, such as data associated with users, files that have been protected with an IRM policy, and log data associated with activity corresponding to files 136, can be stored in the information rights data store 163.

Next, a description of examples of the operation of the various components in the networked environment 100 is provided. To begin, a client device 106 associated with a user can be enrolled as a managed device with the management service 119. Additionally, the client device 106 can be associated data storage services that are provided by the computing environment 103 or a third party data storage service.

A user account within the enterprise can be associated with files 136 that are stored in the data store 116. In some scenarios, a user account can also be associated with a user account and authentication credentials within the information rights server 109. Files 136 can be assigned by an administrator to one or more user accounts within the data store 116. A file 136 can also be associated with a content policy 137 that specifies whether the file 136, if downloaded to a client device 106 and stored as a local file 155, should be stored as a protected file with an IRM policy applied to the local file 155. The content policy 137 can also specify whether an IRM policy should be applied to the local file 155 or the file 136 stored in the data store 116 if either file is shared with another user.

In some scenarios, a default content policy 137 can be established that applies to newly created files 136 that are associated with a particular user account, whether the newly created files 136 are stored in the data store 116 or a third party repository. In some instances, multiple default content policies 137 can be established for different files 136 that are newly created depending upon a host of factors. For example, separate default content policies 137 can be established depending upon a storage location of a file 136, such as whether the file 136 is stored in a data store 116 associated with the enterprise or a third party data storage service. Another default content policy 137 can apply to particular folders within a user's storage area. Content policies 137 can also be established for different file types, users or user groups within an enterprise. Additionally, different default content policies 137 can be established based upon a location of a client device 106 when a particular file 136 is created. Another data point that can determine the type of content policy 137 that can apply to a newly created file 136 is a compliance status of a client device 106. If a local file 155 is created on client device 106 that is not in compliance with one or more compliance rules, a different content policy 137 can be associated with the local file 155 than if the client device 106 is in compliance with compliance rules.

Accordingly, the file management service 126 can transmit the default content policies 137 to the file management application 139, which can be stored on the client device 106 and can be newly created local files 155 on the client device 106. The file management application 139, or other applications on the client device 106, can be used to create a local file 155 on the client device 106. In this scenario, the file management application 139, upon creation of a local file 155, can apply an IRM policy to the local file 155 as specified by a default content policy 137 and can store the local file 155 as a protected file with the IRM policy applied. The file management application 139 can then upload a local file 155 that is protected with the IRM policy to the file management service 126.

In one example, upon receiving a local file 155 from the file management application 139 that has been protected with an IRM policy, the file management service 126 can remove the IRM policy from the local file 155 and store the file 136 in the data store 116. The file management service 126 can also generate file data 129 that identifies a user or group of users with which the file 136 is associated. The file management service 126 can also associate the file 136 with a content policy 137. In one scenario, the local file 155 can be protected with an IRM policy using credentials of an administrator account or other credentials to which the file management service 126 also has access rather than with a user account of a user of the client device 106. Because the IRM policy was applied using credentials to which the file management service 126 has access, the file management application 139 can remove the IRM policy from the local file 155 and store the file 136 without an applied IRM policy or IRM layer. Additionally, because the IRM policy can be applied using an account other than the user account, a user corresponding to the client device can also be prevented from removing or altering the IRM policy that is applied when a file 136 is stored as local file 155.

In some examples, the credentials with which the file management application 139 can remove an IRM layer to access a local file 155 can provided to the client device 106 by the management service 119 through use of a configuration profile. The management service 119 can embed a key or other form of credential in a configuration profile that is transmitted to the client device 106 and installed on the client device 106 by the management component 143 or the operating system of the client device 106.

In one scenario, to access a local file 155 that has an IRM layer applied, the file management application 139 can retrieve the credentials associated with the IRM layer from the configuration profile that is installed on the client device 106. In this scenario, the file management application 139 can access a local file 155 that has an IRM layer applied without user intervention or without the user providing any credentials. In some scenarios, a user may even be unaware that a local file 155 has an IRM layer applied because the credentials associated with the IRM technology are installed on the client device 106 in a configuration profile that was pushed to the client device 106 by the management service 119 and installed by the management component 143 upon enrollment of the client device 106 with the management service 119. Similarly, to apply an IRM layer to a local file 155, the file management application 139 can generate a protected file using the one or more credentials that are embedded within the configuration file installed on the client device 106 by the management component 143 or the operating system of the client device 106.

In some examples, file management application 139 can query the management component 143 to determine whether the client device 106 is violating one or more compliance rules before retrieving the credential from the configuration profile. If the client device 106 is violating a compliance rule, the file management application 139 can indicate to the user that access to the local file 155 is restricted or not permitted due to the violation of compliance rules.

In some examples, the management component 143 can monitor compliance of the client device 106 with compliance rules that are specified by the management service 119. Should the client device 106 run afoul of one or more compliance rules, the management component 143 can deactivate or remove credentials associated with an IRM technology from the client device 106. In one example, the management component 143, through the operating system of the client device 106, can deactivate the configuration profile in which credentials associated with an IRM technology are stored.

The file management application 139 can also facilitate sharing of a file 136 or local file 155. A file 136, a local file 155, or a file that is stored in a third party repository, can be shared with an IRM policy applied so that unauthorized use or distribution of the file 136 or local file 155 can be prevented using security mechanisms that are contemplated by the IRM technology associated with the IRM policy. The terms under which a file 136 can be shared can be specified in the content policy 137 associated with the file 136. For example, a content policy 137 can specify that a file 136 can be shared with other users within an enterprise without an IRM policy applied to the file 136. The content policy 137 can also specify that a file 136 or local file 155 can only be shared with other users with a particular IRM policy applied that requires a recipient of the file 136 or local file 155 to also have a user account with an IRM server 109 corresponding to the IRM policy that is specified by the content policy 137.

In one scenario, the file management application 139 can allow a user to enter a user identifier of a recipient of a file 136 or local file 155 with which the user wants to share a file 136 or local file 155. The user identifier can be an email address of the user or another username associated with the information rights server 109. If the file that the user wishes to share corresponds to a local file 155, the file management application 139 can determine whether a content policy 157 associated with a local file 155 specifies sharing restrictions for the local file 155. The sharing restrictions can identify users or user groups to whom a file is permitted to be shared as well as a specified IRM policy that must be applied to the local file 155 before it can be shared. In this scenario, if the local file 155 is stored at rest with an IRM policy applied, the file management application 139 can remove the IRM policy and apply the IRM policy specified by the content policy 157 to generate a protected file.

In one example, the applied IRM policy can identify the users who are permitted to access the contents of the file. Next, the file management application 139 can initiate transmission of the protected file to the recipients. For example, the protected file can be attached to an email message or shared using a file sharing mechanism supported by the file management application 139 or any other application executed by the client device 106. In another example, the protected file can be added to a user account of the user so that the recipient user can access the file using the file management application 139.

In some scenarios, the file management application 139 can allow a user to browse files 136 that are stored in the data store 116 that are associated with a user account of the user that are not stored as local files 155 on the client device 106. Accordingly, the file management application 139 can also initiate sharing of a file 136 stored on the data store 116. In this scenario, the user can enter a user identifier, such as an email address or username, of one or more recipients of the file 136. The file management application 139 can generate and transmit a request to share a file 136 with the recipient users to the file management service 126. In response, the file management service 126 can identify a content policy 137 that applies to the file 136. If the content policy 137 permits sharing of the file the identified recipients, the file management service 126 can then apply an IRM policy that specifies the permissions associated with the file 136 by the content policy 137. The file management service 126 can then transmit the file 136 to the recipients or associate the file 136 with respective user accounts of the recipients.

The file management application 139 and file management service 126 can also log activity with respect to a file 136 or local file 155. For example, should a user share a file 136 or local file 155 protected with an IRM policy with another user, a file management application 139 or other viewer application with which the contents of the file 136 or local file 155 can report activity data to the information rights server 109 or file management service 126. In one example, a particular IRM technology associated with an IRM policy applied to a file 136 or local file 155 can cause a viewer application to report any attempts to open or access the contents of a protected file to an information rights server 109. The file management service 126 can obtain log data associated with a particular protected file from the information rights server 109. Additionally, viewer applications can also report unauthorized attempts to access or share a protected file. The file management service 126 can also obtain log data associated with unauthorized activity associated with a file.

In some examples, an information rights server 109 associated with a particular IRM technology can assign a globally unique identifier (GUID) to a file 136 or local file 155 that is protected using an IRM policy associated with the information rights server 109. A viewer application in which the file 136 or local file 155 is viewed can report usage data associated with the file 136 or local file 155 to the information rights server 109. The file management service 126 can obtain the GUID associated with a particular file 136 or local file 155 and also obtain usage data with respect to the file 136 or local file 155. In one scenario, an administrator or other user can access activity or audit logs with respect to a file 136 or local file 155. The activity or audit logs can allow a user to view when and how often a particular file 136 or local file 155 was accessed as well as whether the file 136 or local file 155 was redistributed to other users, if the IRM technology associated with an applied IRM policy permits redistribution of the file 136 or local file 155.

Figure 2:
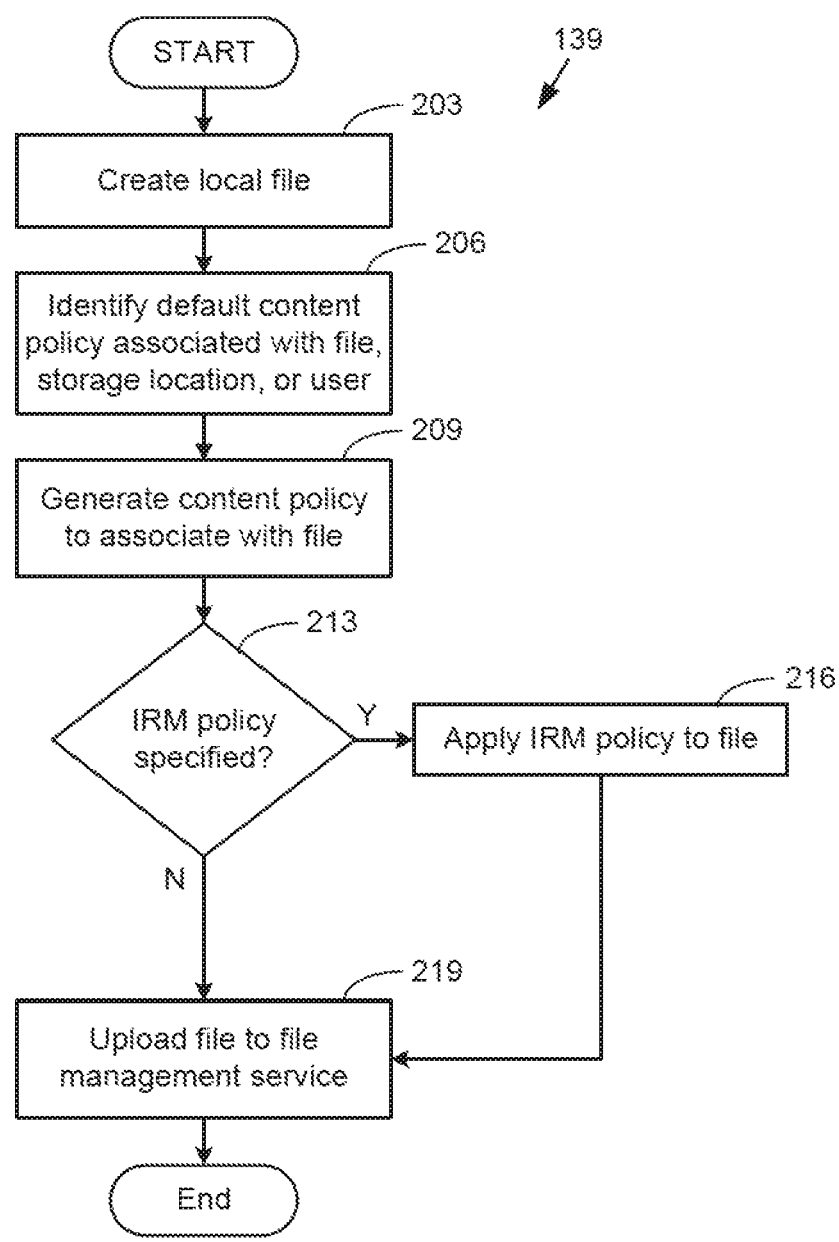
FIG. 2 is a flowchart illustrating an example of functionality implemented by a file management application in a client device of the networked environment of FIG. 1 according to various examples.

With reference to FIG. 2, shown is a flowchart that provides an example of a portion of the operation of the file management application 139. In particular, FIG. 2 provides an example of the file management application 139 facilitating creation of a local file 155 and securing of the local file 155 with an IRM policy. As an alternative, the flowchart of FIG. 2 can be viewed as depicting an example of elements of a method implemented in the client device 106.

Beginning with step 203, the file management application 139 can create a local file 155. The file management application 139 can create a local file 155 in response to a request from a user. For example, a user can create a document, image, photo, or other type of file using the client device 106 for storage in the client data store 151. At step 206, the file management application 139 can identify whether a default content policy 157 is associated with a file type, a storage location of the file, a user account or a user group of the user, or other aspects of the local file 155 that can be specified by one or more default content policies 157. As noted above, the file management application 139 can obtain default content policies 157 from the file management service 126, which can be specified by an administrator or other user administering the file management service 126 on behalf of an enterprise.

At step 209, the file management application 139 can generate a content policy 157 with which the local file 155 can be stored in the client data store 151 based upon the identified default content policy 157. At step 213, the file management application 139 can determine whether the content policy 157 associated with the local file 155 specifies that an IRM policy must be applied to the file when the local file 155 is at rest on the client device 106. If the content policy 157 does not specify that an IRM policy must be applied to the local file 155, then the process proceeds to step 219, where the file management application 139 uploads the local file 155 to the file management service 126. If the content policy 157 specifies that the local file 155 must be protected with an IRM policy, then the process proceeds to step 216, where the file management application 139 applies the specified IRM policy to the local file 155 that is stored in the client data store 151.

Figure 3:
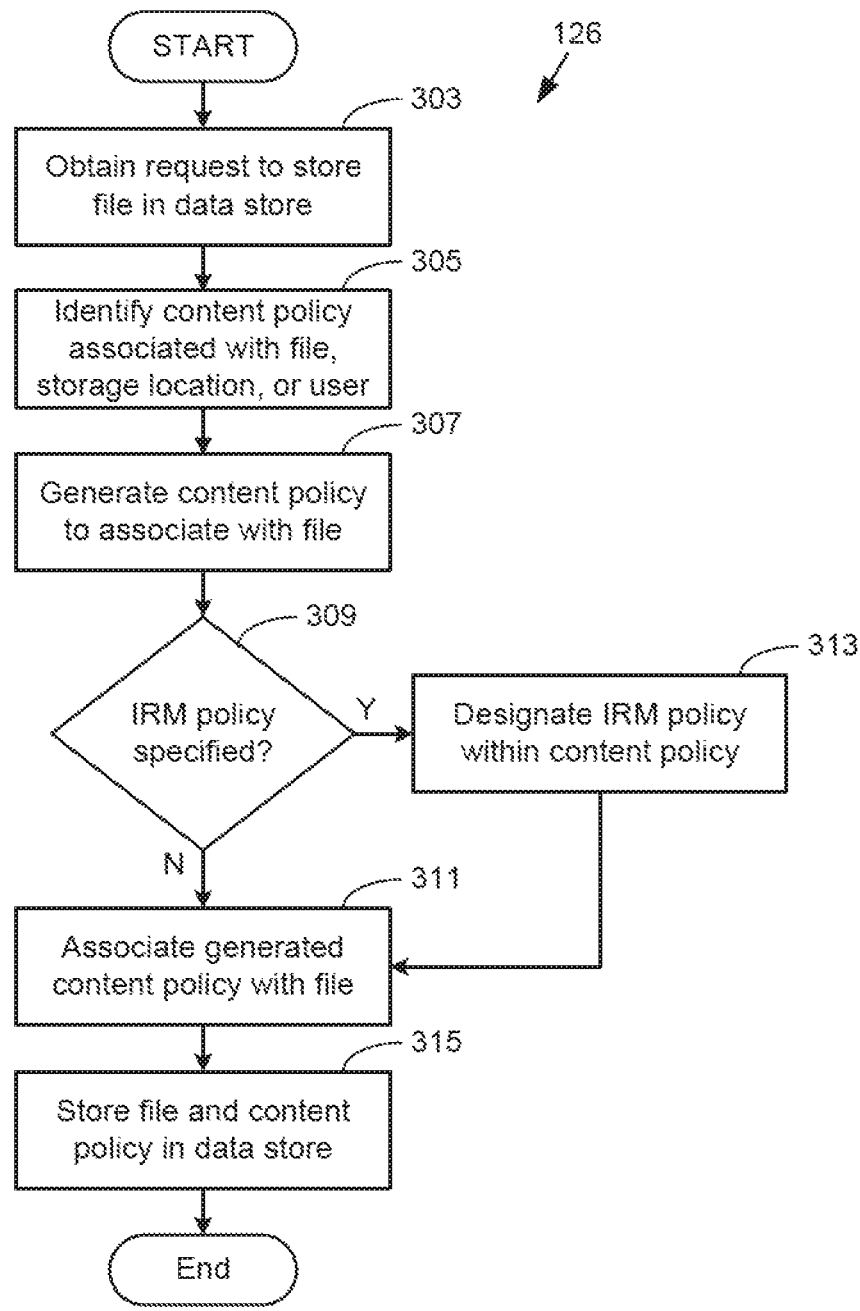
FIG. 3 is a flowchart illustrating an example of functionality implemented by a file management service in a computing environment of FIG. 1 according to various embodiments.

With reference to FIG. 3, shown is a flowchart that provides an example of a portion of the operation of the file management service 126. In particular, FIG. 3 provides an example of the file management service 126 obtaining a file 136 that is stored in the data store 115 on behalf of a user. As an alternative, the flowchart of FIG. 3 can be viewed as depicting an example of elements of a method implemented in the computing environment 103.

Beginning at step 303, the file management service can obtain a request to store a file 136 in the data store 116 on behalf of a user. The request can be received from a file management application 139 executing on a client device 106 or through another user interface through which files 136 can be uploaded to the file management application 126. At box 305, the file management service 126 can identify a content policy 137 associated with the file 136. The content policy 137 can be provided with the file 136 if the file 136 is received from a client device 106 submitting a request to store the file 136 in the data store 116. In another scenario, the content policy 137 can be a default content policy 137 that is generated for the file 136 by the file management service 126. At step 307, the file management service 126 can generate a content policy 137 that can be associated with the file 136 in the data store 116.

At step 309, the file management service 126 can determine whether the content policy 137 specifies that an IRM policy should be associated with the file 136. If so, then the file management service 126 can designate the specified IRM policy in the content policy 137 at step 313. If not, the process can proceed to step 311. At step 311, the file management service 126 can associate the content policy 137 and the file 136 with one another. At step 315, the file management service 126 can store the file 136 and the content policy 137 in the data store 116. Thereafter, the process can proceed to completion.

Figure 4:
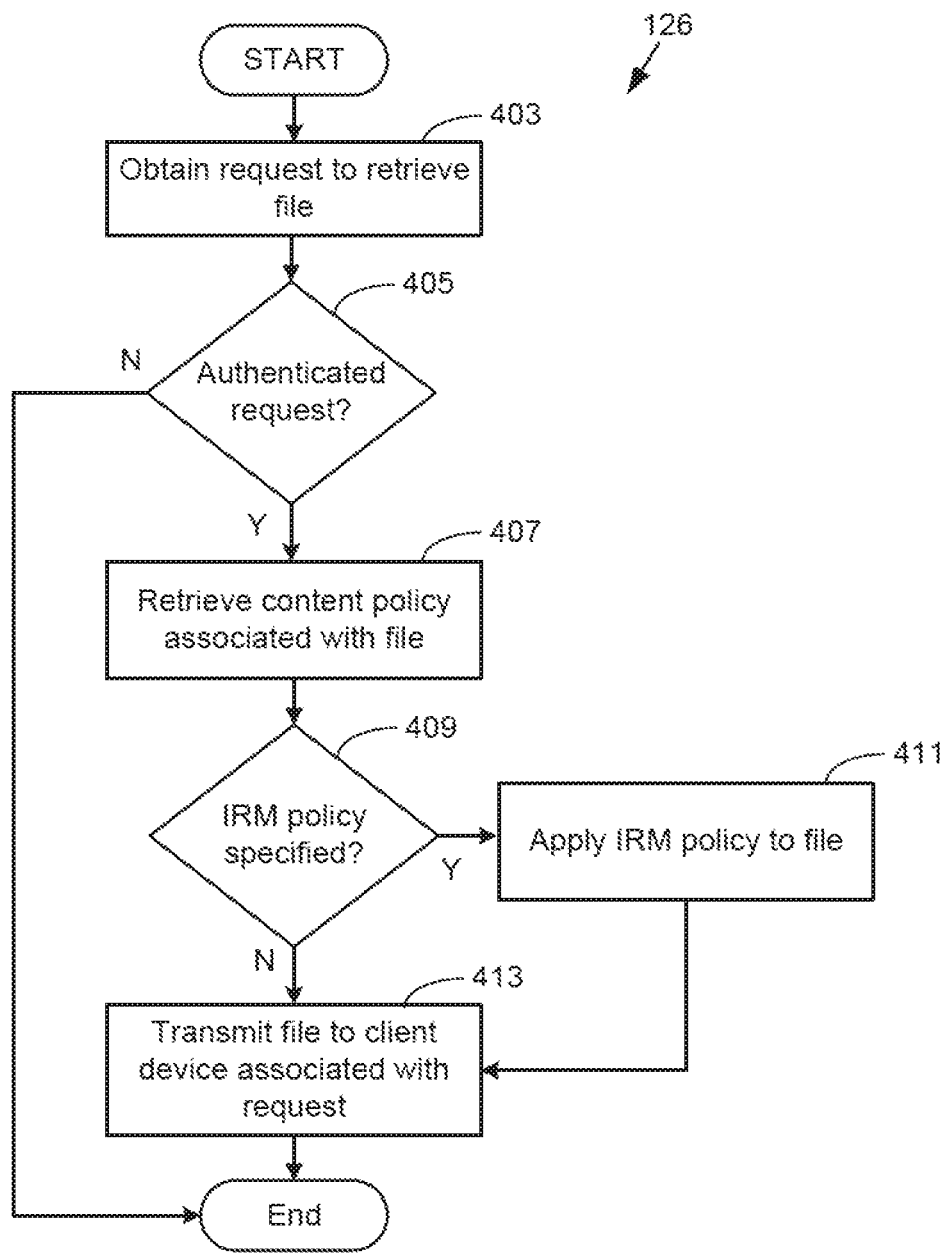
FIG. 4 is a flowchart illustrating an example of functionality implemented by a file management service in a computing environment of FIG. 1 according to various embodiments.

With reference to FIG. 4, shown is a flowchart that provides an example of a portion of the operation of the file management service 126. In particular, FIG. 4 provides an example of the file management service 126 providing a file 136 from the data store 116. As an alternative, the flowchart of FIG. 4 can be viewed as depicting an example of elements of a method implemented in the computing environment 103.

Beginning at step 403, the file management service 126 obtains a request to retrieve a file 136 from the data store 116. At step 405, the file management service 126 can authenticate the request by determining whether a user or client device 106 corresponding to the request is authorized to access the requested file 136. If the request is not authenticated, the process can proceed to completion. If the request is authenticated, the process can proceed to step 407, where the file management service 126 can retrieve a content policy 137 associated with the requested file 136. At step 409, the file management service 126 can determine whether the content policy 137 specifies that an IRM policy must be applied to the file 136 when the file 136 is at rest on a client device 106. If so, then at step 411, the file management service 126 can apply the IRM policy specified by the content policy 137.

Next, the process can proceed to step 413, where the requested file 136 is transmitted to the client device 106 associated with the request to retrieve the file 136. If, at step 409, the file management service 126 determines that no IRM policy is required to transmit the file 136 to the client device 106, the process can proceed directly from step 409 to step 413. Thereafter, the process can proceed to completion.

Figure 5:
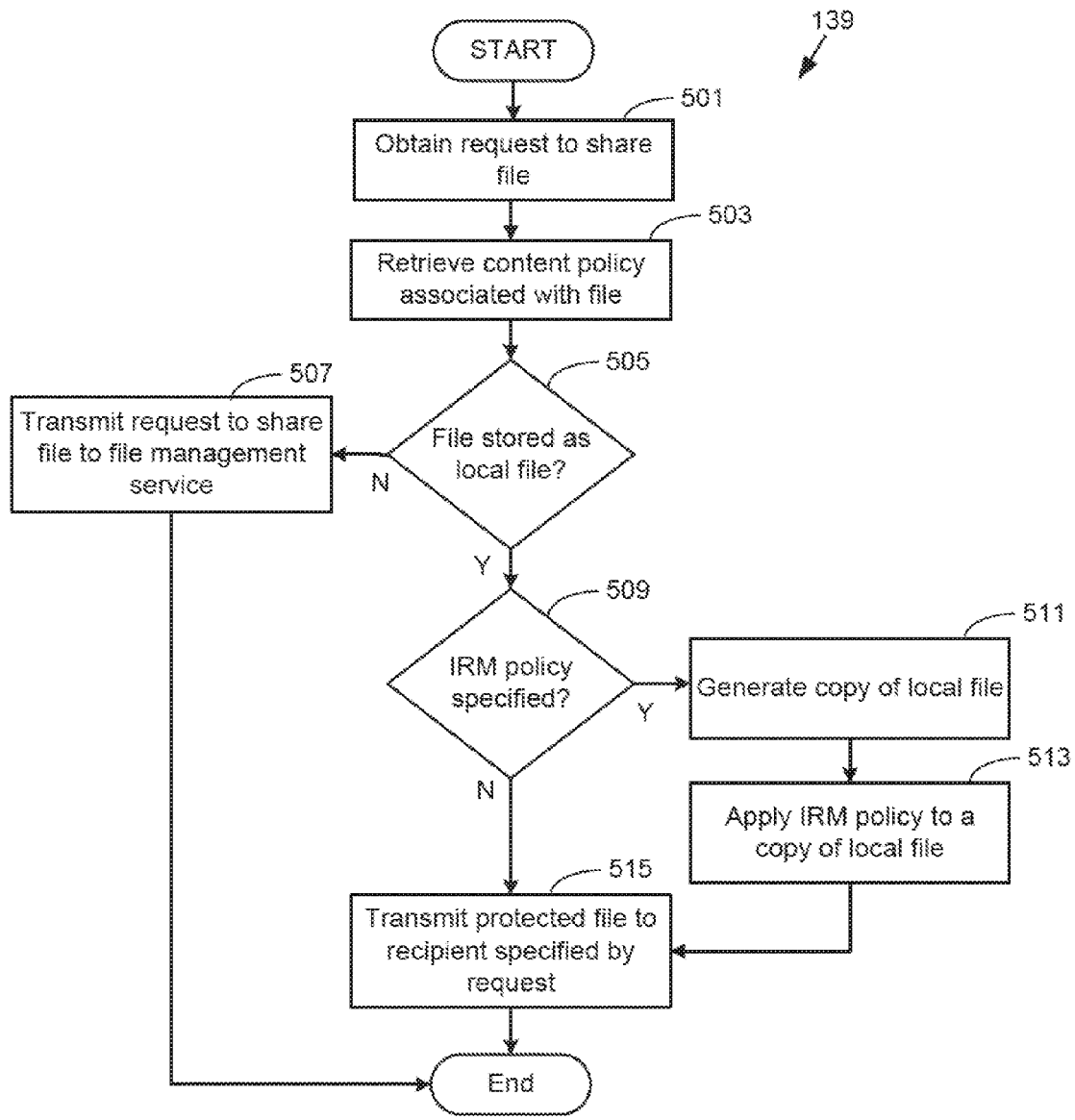
FIG. 5 is a flowchart illustrating an example of functionality implemented by a file management application in a client device of the networked environment of FIG. 1 according to various examples.

With reference to FIG. 5, shown is a flowchart that provides an example of a portion of the operation of the file management application 139. In particular, FIG. 5 provides an example of the file management application 139 initiating sharing of a file with another user. As an alternative, the flowchart of FIG. 5 can be viewed as depicting an example of elements of a method implemented in the client device 106.

Beginning at step 501, the file management application 139 can obtain a request to share a file 136 or a local file 155 associated with a user account. At step 503, the file management application 139 can obtain a content policy 137 associated with the file 136 or local file 155. At step 505, the file management application 139 can determine whether the file 136 is stored as a local file 155 or housed in the data store 116. If the file 136 is not stored as a local file 155, the process can proceed to step 507. At step 507, the file management application 139 can transmit a request to share the file 136 to the file management service 126, which can handle a request to share a file 136 that is stored in the data store 116 on behalf of the file management application 139. Thereafter, the process can proceed to completion.

If the file 136 is stored as a local file 155, the process can proceed to step 509, where the file management application 139 determines whether an IRM policy is specified by the content policy 157 that is associated with the local file 155. If so, the process proceeds to step 511. At step 511, the file management application 139 generates a copy of the local file 155 without any IRM policy applied. If the local file 155 is stored with an IRM policy applied, the file management application 139 can remove the IRM policy because it has access to an administrator credential or credential in a configuration profile with which the IRM policy was applied. If not, the process can proceed to step 515, where the local file 155 is transmitted to a recipient. At step 513, the file management application 139 can apply the IRM policy specified by the content policy 157 to generate a protected file. At step 515, the file management application 139 can transmit the protected file to a recipient. Thereafter, the process proceeds to completion.

Figure 6:
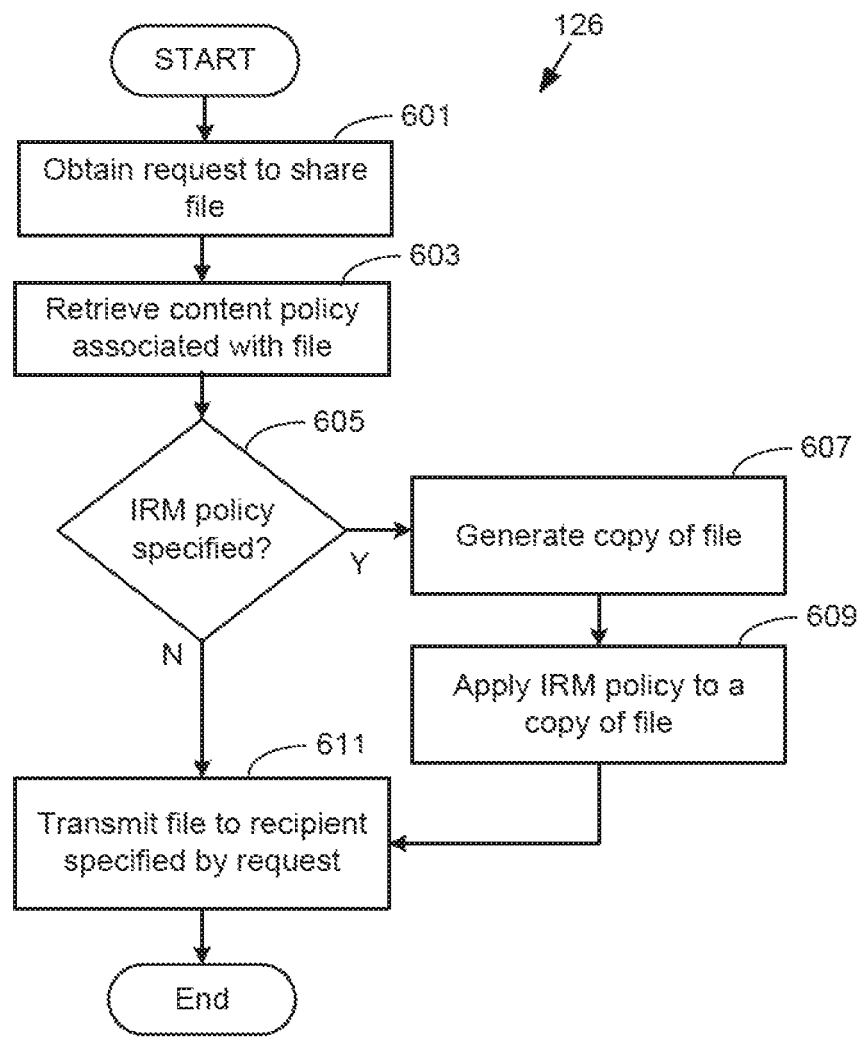
FIG. 6 is a flowchart illustrating an example of functionality implemented by a file management service in a computing environment of FIG. 1 according to various embodiments.

With reference to FIG. 6, shown is a flowchart that provides an example of a portion of the operation of the file management service 126. In particular, FIG. 6 provides an example of the file management service 126 facilitating sharing of a file 136 from the data store 116 with a recipient. As an alternative, the flowchart of FIG. 6 can be viewed as depicting an example of elements of a method implemented in the computing environment 103.

Beginning with step 601, the file management service 126 can obtain a request to share a file 136 that is stored in the data store 116. As noted in the discussion of FIG. 5, the file management application 139 can facilitate sharing of a file 136 that is associated with a particular user account that is not stored as a local file 155 on the client device 106 on which the file management application 139 is executed. At step 603, the file management service 126 can retrieve a content policy 137 that is associated with the file 136. At step 605, the file management service 126 can analyze the content policy 137 to determine whether the content policy 137 specifies an IRM policy that must be applied to the file 136 in order for the file 136 to be shared.

If the content policy 137 specifies that no IRM policy need be applied, the process can proceed to step 611, where the file management service 126 can transmit the file to the recipient as specified by the request. If the content policy 137 specifies that an IRM policy must be applied, then at step 607, the file management service 126 can generate a copy of the file 136. At step 609, the file management service 126 can apply an IRM policy to the copy of the file to generate a protected file. At step 611, the file management service 126 can transmit the protected file to the recipient as specified by the request. Thereafter, the process can proceed to completion.

Figure 7:
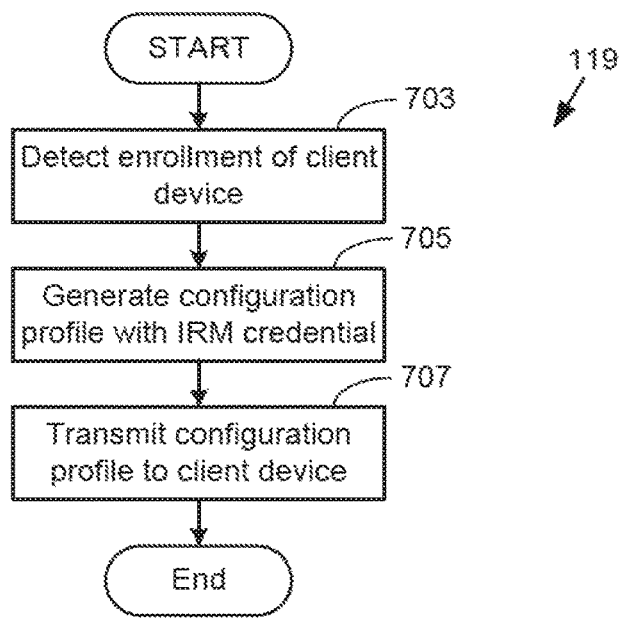
FIG. 7 is a flowchart illustrating an example of functionality implemented by a management service in a computing environment of the networked environment of FIG. 1 according to various examples.

With reference to FIG. 7, shown is a flowchart that provides an example of a portion of the operation of the management service 119. In particular, FIG. 7 provides an example of the management service 119 providing a credential associated with an IRM technology to a client device 106. As an alternative, the flowchart of FIG. 7 can be viewed as depicting an example of elements of a method implemented in the computing environment 103.

First, at step 703, the management service 119 can detect enrollment of a client device 106 with the management service 119. For example, a user can enroll a client device 106 with the management service 119 operated by an enterprise where the user has a user account by providing his or her username and password. Upon enrollment of the client device 106, the management service 119 can generate a configuration profile for the client device 106 that includes one or more credentials associated with an IRM policy that can be applied by the file management service 139 to local files 115. At step 707, the management service 119 can transmit the configuration profile to the client device 106. In one example, the configuration profile can be sent to the management component 143, which can install the configuration profile on the client device 106. In another scenario, the configuration profile can be installed by the operating system of the client device 106. In either scenario, the configuration profile can be installed such that the one or more credentials are inaccessible to a user of the client device 106. Thereafter, the process proceeds to completion.

Figure 8:
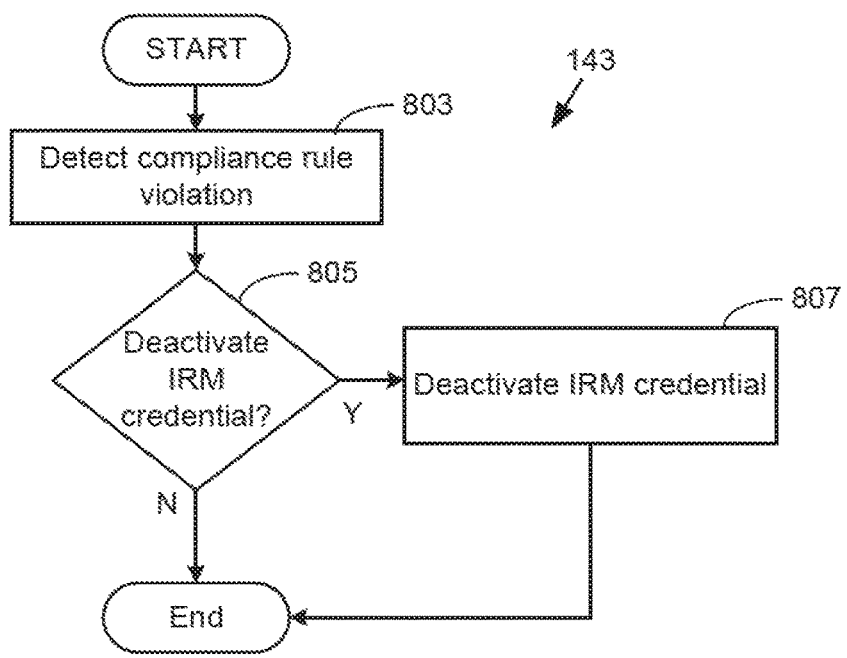
FIG. 8 is a flowchart illustrating an example of functionality implemented by a file management application in a client device of FIG. 1 according to various embodiments.

With reference to FIG. 8, shown is a flowchart that provides an example of a portion of the operation of the management component 143. In particular, FIG. 8 provides an example of the management component 143 deactivating a credential with which an IRM policy is applied to a local file 155. As an alternative, the flowchart of FIG. 8 can be viewed as depicting an example of elements of a method implemented in the client device 106.

A credential associated with an IRM technology, as noted above, can be installed on the client device 106 in a configuration profile. The configuration profile can be installed by the management component 143. For example, upon enrollment of the client device 106 with the management service 119, the management service 119 can transmit the configuration profile containing one or more credentials that can be used for one or more IRM technologies to the client device 106. The configuration profile can be received and installed by the management component 143 using operating system application programming interfaces (APIs) that provide device management capabilities to the management component 143 and management service 119.

At step 803, the management component 143 can detect violation of a compliance rule by the client device 106. For example, an operating system or other aspects of the client device 106 may have been tampered with by a user. Unauthorized applications or software may have been installed on the client device 106. The geographical or network location of the client device 106 may reflect that the device is in an unauthorized location. In another scenario, the network address of the client device 106 may reflect that the client device 106 is connected to an authorized network. At step 805, the management component 143 can determine whether the compliance rule that is violated specifies that the management profile containing the one or more credentials should be deactivated or otherwise removed from the client device 106 in view of the compliance rule violation. If the violated compliance rule does not specify that the one or more credentials should be deactivated or removed from the client device 106, the process can proceed to completion.

If the compliance rule that is violated specifies that the configuration profile containing the one or more credentials should be deactivated or removed, then at step 807, the management component 143 can do so. Thereafter, the process proceeds to completion. The configuration profile containing the one or more credentials can be deactivated by causing the credentials stored within the configuration profile to be unavailable to the file management application 139. In another scenario, the management component 143 can delete or remove the configuration profile from the client device 106. In yet another example, the management component 143 can encrypt the one or more credentials within the configuration profile so that the credentials are inaccessible to the file management application 139.

The flowcharts of FIGS. 2-8 show an example of the functionality and operation of implementations of components described herein. The components described herein can be embodied in hardware, software, or a combination of hardware and software. If embodied in software, each element can represent a module of code or a portion of code that includes program instructions to implement the specified logical function(s). The program instructions can be embodied in the form of source code that includes human-readable statements written in a programming language or machine code that includes machine instructions recognizable by a suitable execution system, such as a processor in a computer system or other system. If embodied in hardware, each element can represent a circuit or a number of interconnected circuits that implement the specified logical function (s).

Although the flowcharts of FIGS. 2-8 show a specific order of execution, it is understood that the order of execution can differ from that which is shown. The order of execution of two or more elements can be switched relative to the order shown. Also, two or more elements shown in succession can be executed concurrently or with partial concurrence. Further, in some examples, one or more of the elements shown in the flowcharts can be skipped or omitted. In addition, any number of counters, state variables, warning semaphores, or messages could be added to the logical flow described herein, for purposes of enhanced utility, accounting, performance measurement, or troubleshooting aid. It is understood that all of these variations are within the scope of the present disclosure.

The client devices 106, or other components described herein, can each include at least one processing circuit. The processing circuit can include one or more processors and one or more storage devices that are coupled to a local interface. The local interface can include a data bus with an accompanying address/control bus or any other suitable bus structure. The one or more storage devices for a processing circuit can store data or components that are executable by the one or processors of the processing circuit. Also, a data store can be stored in the one or more storage devices.

The file management service 126, file management application 139, and other components described herein can be embodied in the form of hardware, as software components that are executable by hardware, or as a combination of software and hardware. If embodied as hardware, the components described herein can be implemented as a circuit or state machine that employs any suitable hardware technology. The hardware technology can include one or more microprocessors, discrete logic circuits having logic gates for implementing various logic functions upon an application of one or more data signals, application specific integrated circuits (ASICs) having appropriate logic gates, programmable logic devices (e.g., field-programmable gate array (FPGAs), and complex programmable logic devices (CPLDs)).

Also, one or more or more of the components described herein that includes software or program instructions can be embodied in any non-transitory computer-readable medium for use by or in connection with an instruction execution system such as a processor in a computer system or other system. The computer-readable medium can contain, store, or maintain the software or program instructions for use by or in connection with the instruction execution system.

The computer-readable medium can include physical media, such as, magnetic, optical, semiconductor, or other suitable media. Examples of a suitable computer-readable media include, but are not limited to, solid-state drives, magnetic drives, flash memory. Further, any logic or component described herein can be implemented and structured in a variety of ways. One or more components described can be implemented as modules or components of a single application. Further, one or more components described herein can be executed in one computing device or by using multiple computing devices.

It is emphasized that the above-described examples of the present disclosure are merely examples of implementations to set forth for a clear understanding of the principles of the disclosure. Many variations and modifications can be made to the above-described examples without departing substantially from the spirit and principles of the disclosure. All of these modifications and variations are intended to be included herein within the scope of this disclosure.

Therefore, the following is claimed:

1. A method, comprising:
   receiving, from a client device, a request to obtain a file from a data store on behalf of a user account;
   determining that a content policy specifies that the file must be protected at rest on the client device using a first information rights policy;
   causing a configuration profile to be installed on the client device, the configuration profile comprising an administrator credential, wherein the administrator credential is accessible by a file management application of the client device, and wherein the administrator credential is inaccessible by a user of the client device;
   applying the first information rights policy to the file to generate a protected file, wherein access to the file is permitted based on the administrator credential; and
   transmitting the protected file and the content policy to the client device once the first information rights policy is applied to the file, wherein the content policy further specifies a second information rights policy to apply to the file in order to share the file from the client device.

2. The method of claim 1, wherein the file is stored in third party repository external to the data store.

3. The method of claim 1, wherein the second information rights policy permits access to the file based on at least one user credential.

4. The method of claim 1, wherein the first information rights policy references a third party information rights server, wherein the third party information rights server maintains an activity log with respect to the file.

5. The method of claim 1, wherein the first information rights policy is applied using the administrator credential, wherein the administrator credential is separate from a user credential associated with the user.

6. The method of claim 1, further comprising:
obtaining a request on behalf of the user account to share the file with a second user, the second user associated with a second user account;
determining that the content policy specifies a particular information rights policy in order to share the file;
applying the particular information rights policy in response to a determination that the content policy specifies the particular information rights policy in order to share the file; and
transmitting the file with the particular information rights policy applied to a second client device associated with the second user.

7. The method of claim 1, further comprising:
obtaining a request to store a new file in association with the user account from the client device;
determining whether one of a plurality of content policies applies to the request to store the new file based upon at least one of: the user account, a file type of the new file, or a content of the new file; and
storing the new file in a data store, the new file being associated with the user account and the one of the plurality of content policies.

8. The method of claim 7, wherein a new file is stored on the client device with an information rights policy specified by the one of the plurality of content policies applied to the new file.

9. A non-transitory computer-readable medium embodying program instructions executable in at least one computing device, the program instructions being configured to cause at least one computing device to at least:
receive, from a client device, a request to obtain a file from a data store on behalf of a user account;
determine that a content policy specifies that the file must be protected at rest on the client device using a first information rights policy;
cause a configuration profile to be installed on the client device, the configuration profile comprising an administrator credential, wherein the administrator credential is accessible by a file management application of the client device, and wherein the administrator credential is inaccessible by a user of the client device;
apply the first information rights policy to the file to generate a protected file wherein access to the file is permitted based on the administrator credential; and
transmit the protected file and the content policy to the client device once the first information rights policy is applied to the file, wherein the content policy further specifies a second information rights policy to apply to the file in order to share the file from the client device.

10. The non-transitory computer-readable medium of claim 9, wherein the file is stored in a third party repository external to the data store.

11. The non-transitory computer-readable medium of claim 9, wherein the second information rights policy permits access to the file based on at least one user credential.

12. The non-transitory computer-readable medium of claim 9, wherein the first information rights policy references an information rights server, wherein the information rights server maintains an activity log with respect to the file.

13. The non-transitory computer-readable medium of claim 9, wherein the first information rights policy is applied using the administrator credential, wherein the administrator credential is separate from a user credential associated with the user.

14. The non-transitory computer-readable medium of claim 9, wherein the program instructions are further configured to cause the at least one computing device to at least:
obtain a request on behalf of the user account to share the file with a second user; the second user associated with a second user account;
determine that the content policy specifies a particular information rights policy in order to share the file;
apply the particular information rights policy in response to a determination that the content policy specifies the particular information rights policy in order to share the file; and
transmit the file with the particular information rights policy applied to a second client device associated with the second user.

15. The non-transitory computer-readable medium of claim 9, wherein the program instructions are further configured to cause the at least one computing device to at least:
obtain a request to store a new file in association with the user account from the client device;
determine that one of a plurality of content policies applies to the request to store the new file based upon at least one of: the user account, a file type of the new file, or a content of the new file; and
store the new file in a data store, the new file being associated with the user account and the one of the plurality of content policies.

16. The non-transitory computer-readable medium of claim 15, wherein a new file is stored on the client device with an information rights policy specified by the one of the plurality of content policies applied to the new file.

17. A system, comprising:
at least one computing device; and
a file management service executed by the at least one computing device, the file management service configured to cause the at least one computing device to at least:
receive, from a client device, a request to obtain a file from a data store on behalf of a user account;
determine that a content policy specifies that the file must be protected at rest on the client device using a first information rights policy;
cause a configuration profile to be installed on the client device, the configuration profile comprising an administrator credential, wherein the administrator credential is accessible by a file management application of the client device, and wherein the administrator credential is inaccessible by a user of the client device;
apply the first information rights policy to the file to generate a protected file, wherein access to the file is permitted based on the administrator credential; and
transmit the protected file and the content policy to the client device once the first information rights policy is applied to the file, wherein the content policy further specifies a second information rights policy to apply to the file in order to share the file from the client device.

18. The system of claim 17, wherein the file is stored in a third party repository external to the data store.

19. The system of claim 17, wherein the second information rights policy permits access to the file based on at least one user credential.

20. The system of claim 17, wherein the first information rights policy references a third party information rights server, wherein the third party information rights server maintains an activity log with respect to the file.

21. The system of claim 17, wherein the first information rights policy is applied using the administrator credential, wherein the administrator credential is separate from a user credential associated with the user.

22. The system of claim 17, wherein the file management service is further configured to cause the at least one computing device to at least:

obtain a request on behalf of the user account to share the file with a second user; the second user associated with a second user account;

determine that the content policy specifies a particular information rights policy in order to share the file;

apply the particular information rights policy in response to a determination that the content policy specifies the particular information rights policy in order to share the file; and transmit the file with the particular information rights policy applied to a second client device associated with the second user.

23. The system of claim 17, wherein the file management service is further configured to cause the at least one computing device to at least:

obtain a request to store a new file in association with the user account from the client device;

determine that one of a plurality of content policies applies to the request to store the new file based upon at least one of: the user account, a file type of the new file, or a content of the new file; and store the new file in a data store, the new file being associated with the user account and the one of the plurality of content policies.

\* \* \* \* \*